(12) United States Patent
Dionne (10) Patent No.: US 11,352,885 B2
(45) Date of Patent: Jun. 7, 2022

(54) AIRCRAFT POWER PLANT COOLING SYSTEM

(71) Applicant: PRATT & WHITNEY CANADA CORP., Longueuil (CA)

(72) Inventor: Luc Dionne, Candiac (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 246 days.

(21) Appl. No.: 16/842,981

(22) Filed: Apr. 8, 2020

(65) Prior Publication Data

US 2021/0317742 A1  Oct. 14, 2021

(51) Int. Cl.
| | | |
|---|---|---|
| *F01C 11/00* | (2006.01) | |
| *F02B 55/10* | (2006.01) | |
| *F02B 29/04* | (2006.01) | |
| *F02C 6/12* | (2006.01) | |
| *F02C 3/04* | (2006.01) | |
| *F01C 21/06* | (2006.01) | |
| *F02B 53/00* | (2006.01) | |

(52) U.S. Cl.
CPC .............. *F01C 21/06* (2013.01); *F02B 55/10* (2013.01); *F02B 2053/005* (2013.01)

(58) Field of Classification Search
CPC .......... F01C 11/008; F01C 21/18; F02C 6/12; F02C 3/04; F02C 7/04; F02B 29/0418
See application file for complete search history.

(56) References Cited

U.S. PATENT DOCUMENTS

| | | | |
|---|---|---|---|
| 2,737,874 A * | 3/1956 | Gallay ................... | B64D 13/08 |
| | | | 454/76 |
| 2,930,546 A * | 3/1960 | Michel ................ | B64C 29/0066 |
| | | | 244/23 R |
| 6,092,360 A | 7/2000 | Hoag et al. | |
| 6,293,494 B1 | 9/2001 | Scherer et al. | |
| 6,901,737 B2 | 6/2005 | Schnoor | |
| 7,344,107 B2 | 3/2008 | Campbell et al. | |
| 8,141,818 B2 | 3/2012 | Bouldin et al. | |
| 9,254,924 B2 | 2/2016 | Nager et al. | |
| 2005/0115249 A1* | 6/2005 | Haas ...................... | B64D 13/06 |
| | | | 62/86 |
| 2013/0074519 A1 | 3/2013 | Ertz et al. | |
| 2013/0291651 A1* | 11/2013 | Kelnhofer ................ | G01F 1/76 |
| | | | 73/861.351 |
| 2016/0229548 A1* | 8/2016 | Klimpel ................. | B64D 37/32 |
| 2016/0245152 A1* | 8/2016 | Thomassin ............... | F02C 6/12 |
| 2016/0245154 A1* | 8/2016 | Thomassin ......... | F02B 29/0493 |
| 2016/0245166 A1* | 8/2016 | Thomassin ............. | F02B 41/10 |
| 2017/0268409 A1* | 9/2017 | Thomassin ............... | B64C 9/38 |

(Continued)

*Primary Examiner* — Long T Tran
(74) *Attorney, Agent, or Firm* — Norton Rose Fulbright Canada LLP (57) ABSTRACT

A method of cooling an aircraft power plant having a combustion engine is disclosed. The method comprises in a first operating mode, inducing a cooling air flow through a heat exchanger in an air conduit via a flow inducing device fluidly connected to the air conduit, the heat exchanger connected in heat exchange relationship with the power plant of the aircraft. The method comprises, in a second operating mode, bypassing the cooling air flow from the flow inducing device via a selectively closable air outlet of the air conduit downstream of the heat exchanger. A cooling system for an aircraft power plant is also disclosed.

20 Claims, 5 Drawing Sheets

(56) References Cited

U.S. PATENT DOCUMENTS

| | | | |
|---|---|---|---|
| 2018/0155036 A1* | 6/2018 | Hampe, Jr. | B64D 13/00 |
| 2018/0257788 A1 | 9/2018 | Liu | |
| 2020/0362746 A1* | 11/2020 | Lee | B60H 1/06 |
| 2021/0122478 A1* | 4/2021 | Mackin | F01D 15/08 |

* cited by examiner

FIG_3

FIG_4

AIRCRAFT POWER PLANT COOLING SYSTEM

TECHNICAL FIELD

The application relates generally to aircraft power plants and, more particularly, to systems and methods for cooling air to be used by such power plants.

BACKGROUND OF THE ART

An aircraft power plant, such as an auxiliary power unit (APU) or supplemental power unit (SPU), is usually contained within an engine compartment defined by an aircraft. In some cases, either a liquid coolant and/or a lubricant of the power plant needs to be cooled.

SUMMARY

In one aspect, there is provided a cooling system for an aircraft power plant, comprising: a ram air inlet duct; a cooling plenum having an inlet fluidly connected to an outlet of the ram air inlet duct, a first outlet and a second outlet, the first outlet selectively closable; a heat exchanger including at least one first conduit having an inlet fluidly connected to the cooling plenum and at least one second conduit in heat exchange relationship with the at least one first conduit and fluidly connectable to a coolant circuitry of the aircraft power plant, the at least one first conduit having an outlet fluidly connected to the first outlet and the second outlet of the cooling plenum; and a flow inducing device operable for selectively inducing a flow of air from the inlet of the cooling plenum to the second outlet thereof when the first outlet of the cooling plenum is closed.

In another aspect, there is provided a method of cooling an aircraft power plant having a combustion engine, the aircraft power plant provided on an aircraft, the method comprising: in a first operating mode, inducing a cooling air flow through a heat exchanger in an air conduit via a flow inducing device fluidly connected to the air conduit, the heat exchanger connected in heat exchange relationship with the power plant of the aircraft; and in a second operating mode, bypassing the cooling air flow from the flow inducing device via a selectively closable air outlet of the air conduit downstream of the heat exchanger.

In a further aspect, there is provided a method of cooling a power plant of an aircraft, the method comprising: in a first operating mode, driving a flow inducing device to induce a flow of cooling air through a heat exchanger connected in heat exchange relationship with the power plant of the aircraft; and in a second, in flight, operating mode, bypassing the flow inducing device and instead of using an airflow induced by the flow inducing device, using ram air to provide cooling air to the heat exchanger.

DESCRIPTION OF THE DRAWINGS

Reference is now made to the accompanying figures in which.

DETAILED DESCRIPTION

Figure 1:
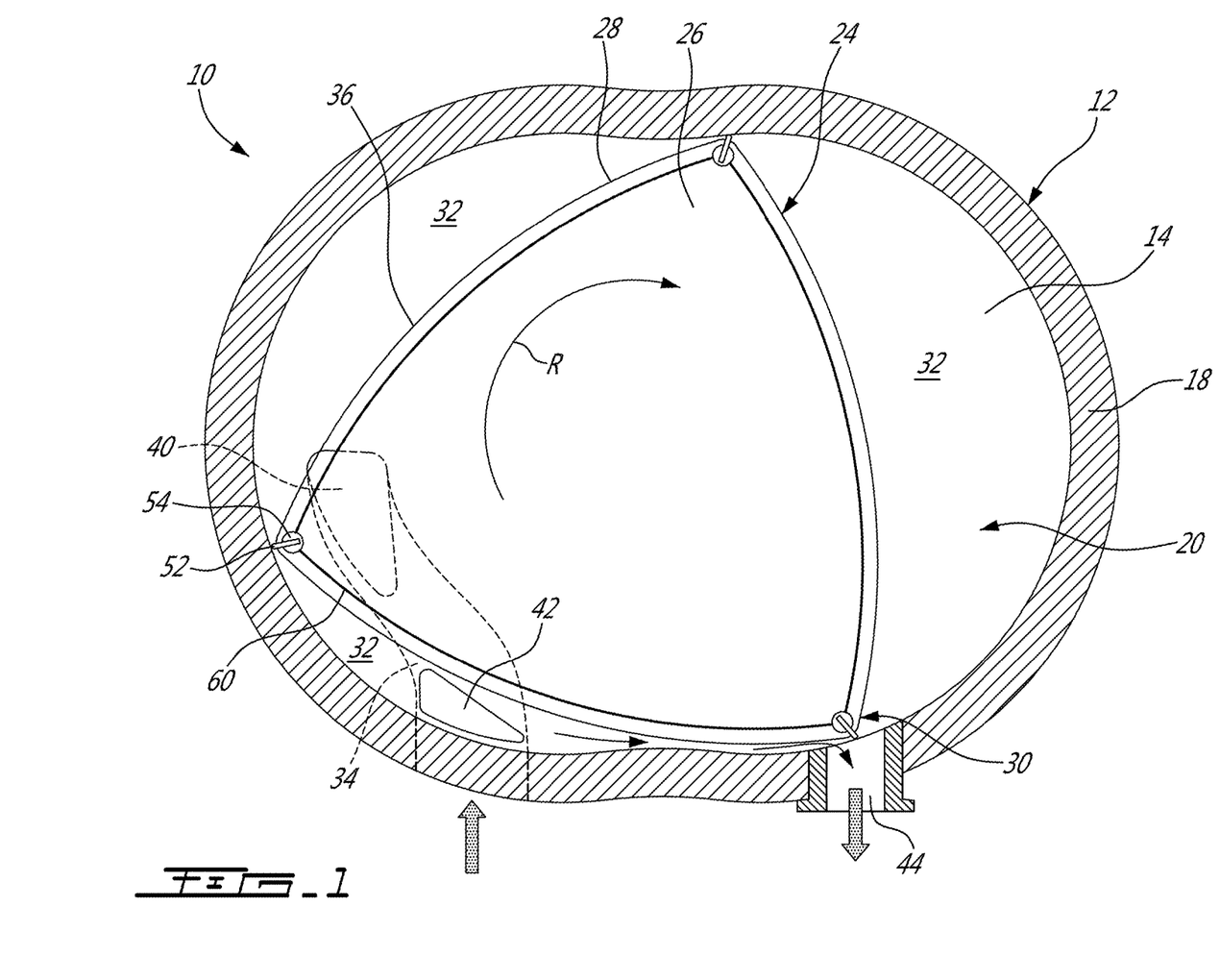
FIG. 1 is a schematic cross-sectional view of a rotary internal combustion engine in accordance with a particular embodiment.

Referring to FIG. 1, a rotary internal combustion engine 10 known as a Wankel engine is schematically shown. The rotary engine 10 comprises an outer body 12 having axially-spaced end walls 14 with a peripheral wall 18 extending therebetween to form a rotor cavity 20. The inner surface of the peripheral wall 18 of the cavity 20 has a profile defining two lobes, which is preferably an epitrochoid.

In a particular embodiment, the outer body 12 is made of aluminum. Aluminum might be advantageous for aircraft applications as it is less dense then steel. However, aluminum has a coefficient of thermal conductivity greater than that of the steel and has a melting point lower than that of the steel. Proper cooling might be required when using an internal combustion engine having a body made of aluminum. More detail about this are presented herein below.

An inner body or rotor 24 is received within the cavity 20. The rotor 24 has axially spaced end faces 26 adjacent to the outer body end walls 14, and a peripheral face 28 extending therebetween. The peripheral face 28 defines three circumferentially-spaced apex portions 30, and a generally triangular profile with outwardly arched sides 36. The apex portions 30 are in sealing engagement with the inner surface of peripheral wall 18 to form three rotating combustion chambers 32 between the inner rotor 24 and outer body 12. The geometrical axis of the rotor 24 is offset from and parallel to the axis of the outer body 12.

The combustion chambers 32 are sealed. In the embodiment shown, each rotor apex portion 30 has an apex seal 52 extending from one end face 26 to the other and biased radially outwardly against the peripheral wall 18. An end seal 54 engages each end of each apex seal 52 and is biased against the respective end wall 14. Each end face 26 of the rotor 24 has at least one arc-shaped face seal 60 running from each apex portion 30 to each adjacent apex portion 30, adjacent to but inwardly of the rotor periphery throughout its length, in sealing engagement with the end seal 54 adjacent each end thereof and biased into sealing engagement with the adjacent end wall 14. Alternate sealing arrangements are also possible.

Although not shown in the Figures, the rotor 24 is journaled on an eccentric portion of a shaft such that the shaft rotates the rotor 24 to perform orbital revolutions within the stator cavity 20. The shaft rotates three times for each complete rotation of the rotor 24 as it moves around the stator cavity 20. Oil seals are provided around the eccentric to impede leakage flow of lubricating oil radially outwardly thereof between the respective rotor end face 26 and outer body end wall 14. During each rotation of the rotor 24, each chamber 32 varies in volumes and moves around the stator cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air, an exhaust port 44, and an optional purge port 42 also in communication with the source of air (e.g. a compressor) and located between the inlet and exhaust ports 40, 44. The ports 40, 42, 44 may be defined in the end wall 14 of in the peripheral wall 18. In the embodiment shown, the inlet port 40 and purge port 42 are defined in the end wall 14 and communicate with a same intake duct 34 defined as a channel in the end wall 14, and the exhaust port 44 is defined through the peripheral wall 18. Alternate configurations are possible.

In a particular embodiment, fuel such as kerosene (jet fuel) or other suitable fuel is delivered into the chamber 32 through a fuel port (not shown) such that the chamber 32 is stratified with a rich fuel-air mixture near the ignition source and a leaner mixture elsewhere, and the fuel-air mixture may be ignited within the housing using any suitable ignition system known in the art (e.g. spark plug, glow plug). In a particular embodiment, the rotary engine 10 operates under the principle of the Miller or Atkinson cycle, with its compression ratio lower than its expansion ratio, through appropriate relative location of the primary inlet port 40 and exhaust port 44.

Figure 2:
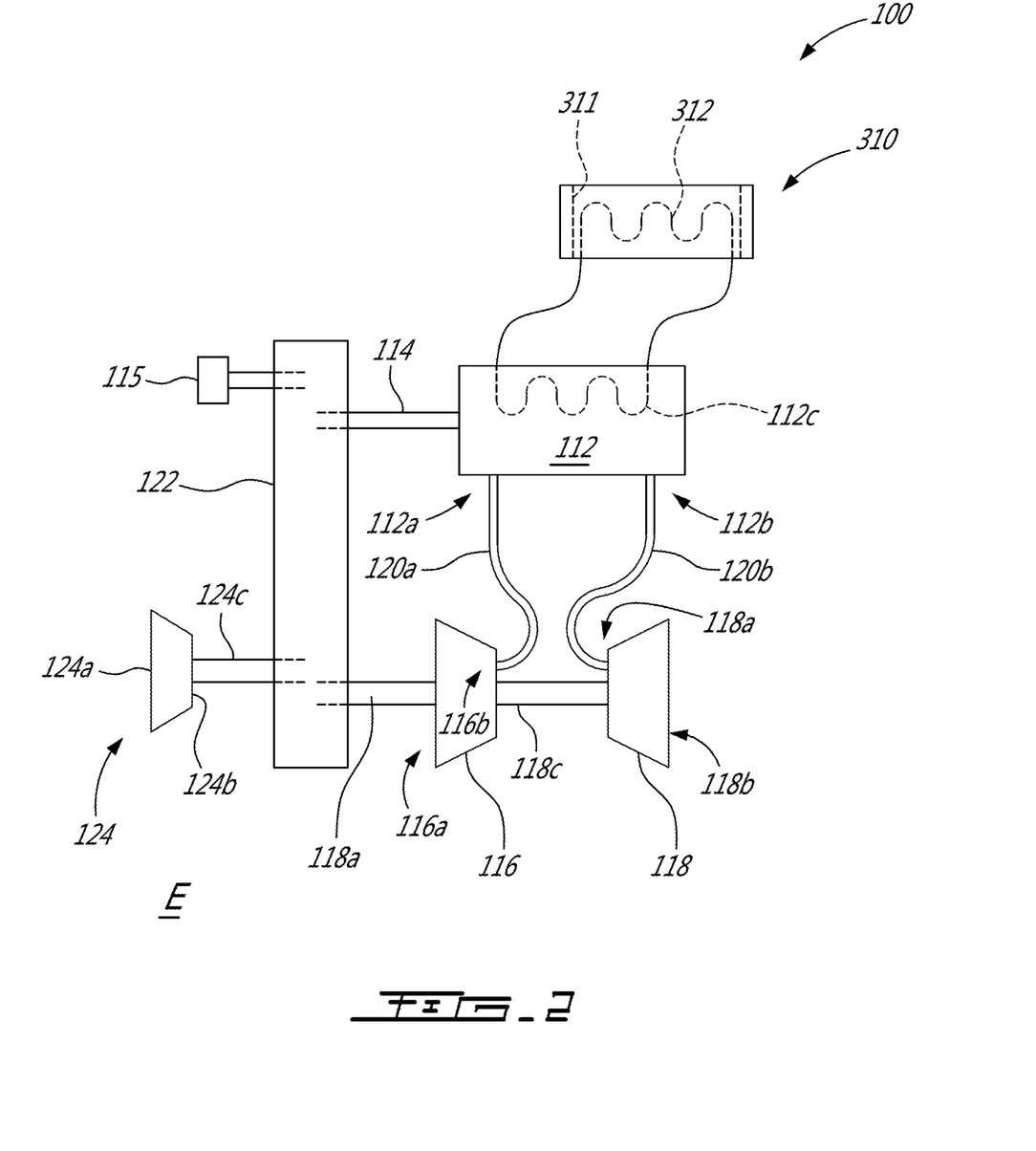
FIG. 2 is a schematic view of an engine assembly in accordance with one embodiment.

Referring to FIG. 2, an engine assembly 100 is generally shown and includes an internal combustion engine 112. In a particular embodiment, the internal combustion engine 112 comprises one or more rotary units each configured for example as a Wankel engine, or one or more reciprocating pistons. The internal combustion engine 112 may be the rotary internal combustion engine 10 described herein above with reference to FIG. 1. Any other suitable intermittent internal combustion engine, such as a piston engine, may be used without departing from the scope of the present disclosure.

The internal combustion engine 112 drives a shaft 114 that is used for driving a rotatable load 115. It is understood that the rotatable load 115 may be any appropriate type of load, including, but not limited to, one or more generator(s), propeller(s), accessory(ies), rotor mast(s), compressor(s), or any other appropriate type of load or combination thereof. In a particular embodiment, the internal combustion engine 112 is a rotary engine comprising three rotary units each configured as a Wankel engine, with a rotor cavity having a profile defining two lobes, preferably an epitrochoid, in which a rotor is received with the geometrical axis of the rotor being offset from and parallel to the axis of the rotor cavity, and with the rotor having three circumferentially-spaced apex portions and a generally triangular profile with outwardly arched sides, so as to define three rotating combustion chambers with variable volume.

In a particular embodiment, the engine assembly 100 is a compound cycle engine system or compound cycle engine such as described in Lents et al.'s U.S. Pat. No. 7,753,036 issued Jul. 13, 2010 or as described in Julien et al.'s U.S. Pat. No. 7,775,044 issued Aug. 17, 2010, or as described in Thomassin et al.'s U.S. patent publication No. 2015/0275749 published Oct. 1, 2015, or as described in Bolduc et al.'s U.S. patent publication No. 2015/0275756 published Oct. 1, 2015, the entire contents of all of which are incorporated by reference herein. The engine assembly 100 may be used as a Supplemental Power Unit (SPU) or as an Auxiliary Power Unit (APU), such as on an aircraft or other vehicle, or in any other suitable application. The engine assembly 100 may include a gas turbine engine such as a turboprop or a turboshaft instead of the internal combustion engine.

In the embodiment shown, the engine assembly 100 includes a compressor 116 for compressing the air before it is fed to an air inlet 112a of the internal combustion engine 112 and a turbine section 118 receiving the exhaust gases from the internal combustion engine 112. It is understood that variations are possible, and that, for example, the compressor 116 and/or turbine section 118 may be omitted.

The compressor has a compressor inlet 116a fluidly connectable to an environment E outside the engine assembly, also referred to herein as a source of ambient air, and a compressor outlet 116b fluidly connected to the air inlet 112a of the internal combustion engine 112 via a conduit 120a. The turbine section 118 includes a turbine inlet 118a fluidly connected to an exhaust 112b of the internal combustion engine 112 via a conduit 120b and a turbine outlet 118b fluidly connected to the environment E for expelling the exhaust gases generated by the internal combustion engine 112.

The internal combustion engine 112 provides an exhaust flow of high pressure hot gas exiting at high peak velocity, in the form of exhaust pulses. In the illustrated embodiment, the exhaust 112b of the internal combustion engine 112 (corresponding to or communicating with an exhaust port of a respective rotary engines/reciprocating pistons of the internal combustion engine 112) is in fluid communication with the turbine inlet 118a of the turbine section 118. Accordingly, the exhaust flow from the internal combustion engine 112 is supplied to the turbine section 118. The turbine section 118 may comprise a single turbine, or two or more turbine stages in serial fluid communication; the two or more turbine stages may have different reaction ratios from one another. Other configurations are contemplated.

In the illustrated embodiment, the internal combustion engine 112, the compressor 116, the rotatable load 115, and the turbine section 118 are in driving engagement with a gearbox 122. The gearbox 122 is configured to allow the turbine section 118 to compound power with the engine shaft 114 and to allow the turbine section 118 and/or the internal combustion engine 112 to drive the compressor 116 and/or the rotatable load 115. In the embodiment shown, the rotatable load 115 is in driving engagement with the engine shaft 114 and/or a turbine shaft 118c via the gearbox 122.

In the illustrated embodiment, the compressor 116 and the turbine section 118 are in a driving engagement with the gearbox 122. In the illustrated embodiment, the compressor and turbine rotors are engaged to the turbine shaft 118c which is drivingly engaged to the engine shaft 114 through the gearbox 120; the turbine shaft 118c and the engine shaft 114 are parallel and radially offset from one another. Alternate configurations are possible, including, but not limited to, the rotor(s) of the compressor 116 being engaged to a shaft separate from the turbine shaft 118c (whether coaxial with the turbine shaft 118c, with the engine shaft 114, or offset from both) and in driving engagement with the turbine shaft 118c and/or the engine shaft 114, for example through the gearbox 120; and/or two or more of the shafts 118a, 114 extending at an angle (perpendicularly or otherwise) to each other.

In the embodiment shown, the engine assembly 100 further includes a load compressor 124 configured for providing compressed air to a pneumatic system of an aircraft containing the engine assembly 100. The load compressor 124 has a load compressor inlet 124a fluidly connected to the environment E and a load compressor outlet 124b fluidly connected to the pneumatic system.

The load compressor 124 includes at least one rotor rotating with a load compressor shaft 124c. The shaft 124c of the load compressor 124 is, in the depicted embodiment, in driving engagement with the engine shaft 114 and/or with the turbine shaft 118c via the gearbox 122. The shaft 124c of the load compressor 124 and the turbine shaft 118c may be monolithic. The load compressor shaft 124c of the load compressor 124 may be coaxial with the turbine shaft 118c.

Figure 3:
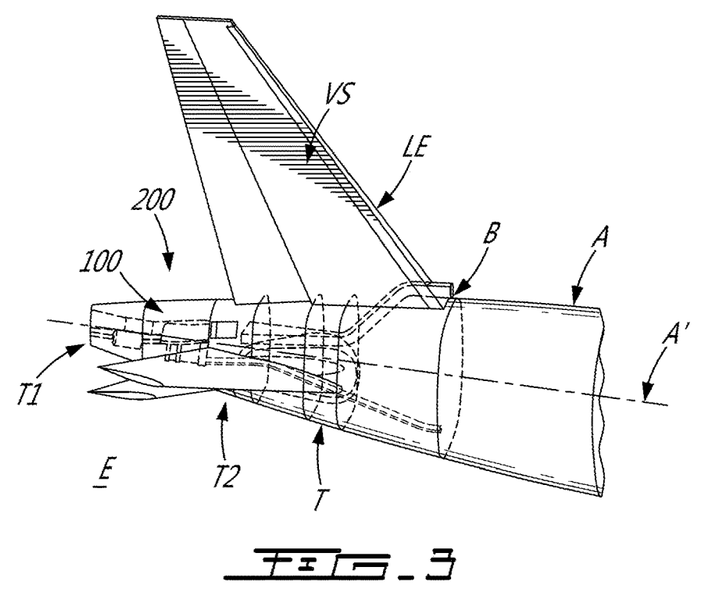
FIG. 3 is a schematic three dimensional partially transparent view of an aircraft power plant in accordance with one embodiment contained within an engine compartment located within a tail section of an aircraft.
Figure 4:
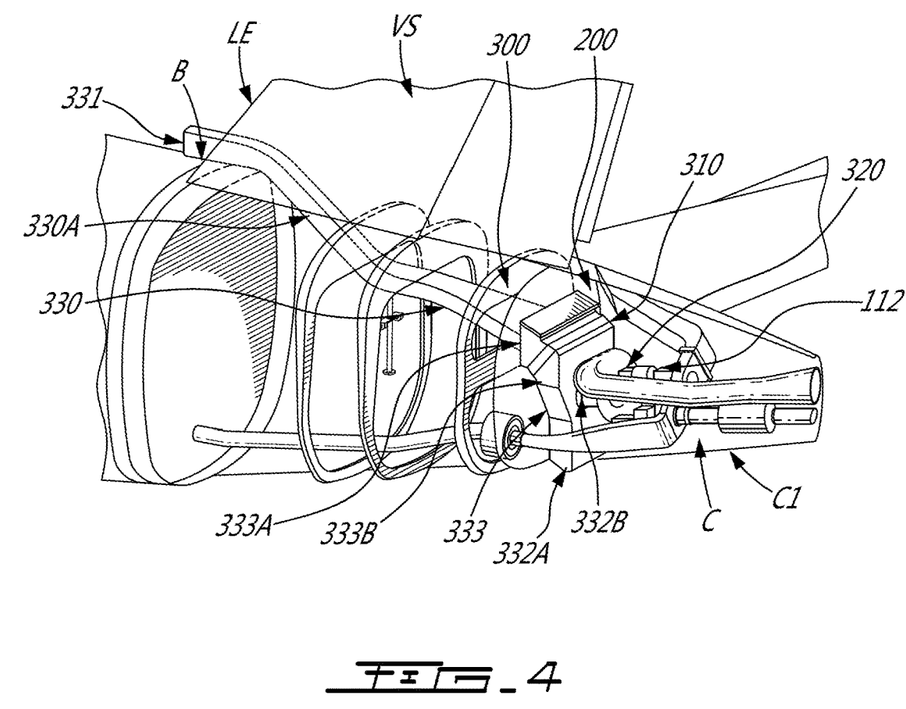
FIG. 4 is another schematic three dimensional partially transparent view of the aircraft power plant of FIG. 3, showing an inside compartment of the tail section of the aircraft.
Figure 5:
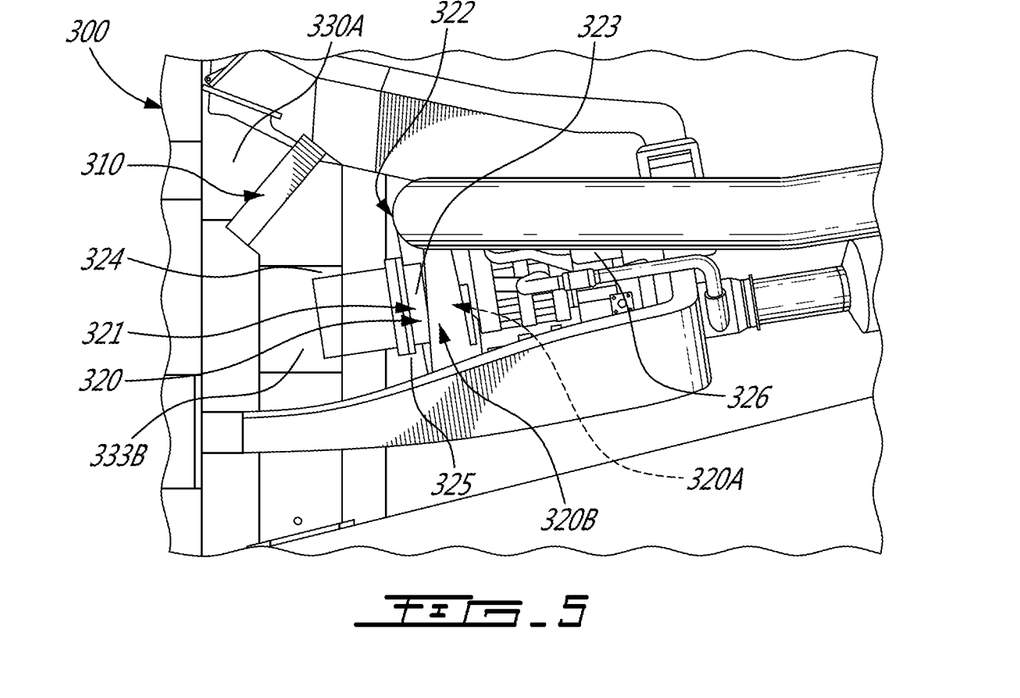
FIG. 5 is a schematic cross-sectional view of the aircraft power plant of FIGS. 3-4.

Referring now to FIGS. 3-5, an aircraft power plant 200, also referred to as a liquid cooled combustion aircraft power plant, which may include the engine assembly 100 of FIG. 2, is shown installed within an engine compartment C located inside a tail section T of an aircraft A. The power plant 200 may be an Auxiliary Power Unit (APU) or a Supplemental Power Unit (SPU) of the aircraft. The tail section T ends at an apex T1. The tail section T may correspond to a portion of the aircraft where a cross-sectional area of the aircraft A decreases along an aircraft axis A' of the aircraft intersecting the apex T1. In other words, a wall T2 of the tail section T converges toward the apex T1. The apex T1 may correspond to a rear-most location of a fuselage of the aircraft A.

The power plant 200 includes a cooling system 300 for cooling the combustion engine 112, notably its lubricants and/or cooling fluids.

The cooling system 300 includes a heat exchanger 310, a flow inducing device 320 and an air conduit 330 fluidly connecting the heat exchanger 310 and the flow inducing device 320. The cooling system 300, via interaction of at least the heat exchanger 310, the flow inducing device 320 and the air conduit 330 may allow distinct operating modes, depending on the aircraft operation and situation. As described later, the cooling system 300 may allow the use of the flow inducing device 320 to induce cooling air flow through the air conduit while the aircraft is on the ground (e.g. still, taxiing, or other low speed states), and/or flight below a predetermined airspeed (e.g. during take-off, and may allow bypassing the cooling air from the flow inducing device 320 in flight and/or above a given airspeed level. The cooling system 300 may thus not require operation of the flow inducing device in certain aircraft operating conditions, which may in turn allow a reduction of fuel consumption of the power plant 200, for operating the cooling system.

The heat exchanger 310 may be used for providing heat exchange relationship between a lubricant circuit of the combustion engine 112 and the air for cooling lubricant circulating within the lubricant circuit. The lubricant may be used, for instance, for lubricating bearings. In a rotary internal combustion engine, for instance, the lubricant may be used for lubricating the faces of the rotor 24 and for cooling down sealing faces of the rotor 24.

The heat exchanger 310 has at least one first conduit 311 (FIG. 2) in fluid flow communication with the air conduit 330 and at least one second conduit 312 (FIG. 2) in heat exchanger relationship with the at least one first conduit 311. The at least one second conduit 312 is connectable to the coolant circuitry 112c (FIG. 2) of the combustion engine 112 (or engine assembly 100). In use, heat generated by the combustion of fuel within combustion chambers of the internal combustion engine 112 is dissipated within a casing, or body, of the internal combustion engine 112. The heat is then transmitted from the body to the liquid coolant circulating within the coolant circuitry 112c before being transmitted from the liquid coolant to the flow of cooling air from the environment E via the heat exchange relationship between the at least one first conduit 311 and at least one second conduit 312 of the heat exchanger 310.

In the depicted embodiment, the air from the environment E penetrates the air conduit 330. The air then circulates through the heat exchanger 310 where it picks up heat from the liquid coolant circulating within the coolant circuitry 112c of the combustion engine 112. The air that has been heated via its passage through the at least one second conduit 312 of the heat exchangers 310 by picking up heat from the liquid coolant is discharged back to the environment E. Discharging the air back to the environment E is performed as described later with respect to exemplary embodiments.

In the depicted embodiment, the heat exchanger 310 includes a plurality of parallel heat exchanger units. The heat exchanger 310 has a panel-like shape. The heat exchanger 310 may have other suitable shapes in other embodiments. The heat exchanger 310 may be a heat exchanger including a plurality of heat exchanger units 310 (i.e. two or more), in cascade or in parallel, depending on the embodiments.

In the depicted embodiment, the flow inducing device 320 includes a blower. The blower includes a blower rotor 320A (or fan wheel) encased in a blower scroll 320B. The blower scroll 320B is mounted about the rotor 320A to collect the air exiting the blower. Other types of flow inducing device 320 may be contemplated, including other types of fan, such as mechanical, electrical or hydraulic cooling fan, as some possibilities.

The flow inducing device 320 has an inlet 321 and an outlet 322. In other words, the flow inducing device 320 defines a flow path extending between an inlet 321 and an outlet 322. The flow inducing device 320 is configured to receive cooling air flowing downstream of the heat exchanger 310. The inlet 321 of the flow inducing device 320 is located downstream of the heat exchanger 310. As such, cooling air flowing through the at least one first conduit of the heat exchanger 310 may then flow through the inlet 321 of the flow inducing device 320, when the flow inducing device 320 is activated. In the depicted embodiment, the outlet 322 of the flow inducing device 320 is defined at the blower scroll 320B exit.

In the depicted embodiment, the flow inducing device 320 includes an inlet conduit 323 defining a bell mouth 324. The inlet 321 of the flow inducing device 320 is in fluid flow communication with the inlet conduit 323. In some embodiments, such as shown, the cooling system 300 may include a variable inlet guide vanes 325 (VIGVs) upstream of the inlet 321. With reference to the depicted embodiment, the VIGVs 325 is located upstream of the blower rotor 320A. In the depicted embodiment, the VIGVs 325 are fluidly connected to the flow inducing device 300 downstream of the bell mouth 324. The VIGVs may be part of the inlet conduit 323 (e.g. the inlet conduit 323 and the VIGVs 325 may be an integral part) or a standalone part connected to the inlet conduit 323 and in fluid flow communication therewith. The VIGVs 325 may prevent, limit, control, or adjust the volume of air flow going through the flow inducing device 300. The volume of air flow may be incidental on the amount of heat rejection required during operation of the power plant 200, for instance depending on the operating modes of the power plant 200. Other devices may be used instead of the VIGVs 325 to prevent, limit, control or adjust the air flow through the flow inducing device 320. For instance, where the flow inducing device 320 is a mechanical cooling fan, a variable speed clutch (not shown) may be drivingly engaged to the mechanical fan and controlled to allow variable flow of cooling air ingested by the cooling fan.

The flow inducing device 320 outflow is discharged to the environment E outside the aircraft. In the depicted embodiment, the outflow is routed outboard via a discharge duct 326 downstream of the outlet 322 of the flow inducing device 320. The discharge duct 326 extends from the outlet 322 of the flow inducing device 320 to an aircraft tail cone compartment C wall C1. The discharge duct 326 has an outlet located at the apex T1 of the tail cone T, adjacent the exhaust outlet of the combustion engine 112 (or engine assembly 100). The location of the discharge duct 326 outlet may be different in other embodiments. Another example of discharge duct 326 will be described later with reference to FIG. 8. Other means to collect the discharged air flow downstream of the flow inducing device 320 may be contemplated in other embodiments.

The air conduit 330 allows air from the environment E outside the aircraft to penetrate into the cooling system 300. The air conduit 330 includes a ram air inlet duct 330A channelling at least part of such ingested air to the heat exchanger 310. At least part of the ingested air through the air inlet 331 may flow through the heat exchanger 310 to cool the coolant circuitry 112c of the combustion engine 112. The ram air inlet duct 300A defines a cooling air flow path from an air inlet 331 to a cooling plenum 333. The air conduit 330 has a first and a second outlets 332A, 332B. In the depicted embodiment, the cooling plenum 333 defines the first and second outlets 332A, 332B. Aspects of the outlets 332A, 332B are discussed later.

The ram air inlet duct 330A has a varying internal cross-section, i.e. varying cross-section size and/or shape or geometry, at least from the air inlet 331. As shown, the ram air inlet duct 330A tapers from the air inlet 331, such that the cross-section at the inlet 331 is larger than the remainder of the ram air inlet duct 330A. The ram air inlet duct 330A has a generally rectangular cross-section at the inlet 331 and transitions to a circular cross-section. Other configurations of the ram air inlet duct 330A may be contemplated in other embodiments. In the depicted embodiment, the inlet 331 is a ram air inlet. The ram air inlet may ingest an air flow (or forced air) at the surrounding of the aircraft in motion. In other words, a ram air inlet, as shown, is oriented relative to the aircraft in such a way as to make use of the kinetic energy of the airflow generated along the aircraft in motion. The forced air induces a dynamic pressure of the air flow and may enter the ram air inlet at a non-zero velocity caused by the aircraft in motion, thereby increasing the static air pressure within the air conduit 330 to produce a forced air flow therethrough. As such, at a given airspeed of the aircraft, air flow may be produced through the air conduit 330 without positive work produced by a powered aircraft device, for instance without a flow inducing device 320 as discussed above. In the depicted embodiment, the ram air inlet (or simply inlet 331) is located at a base B of a vertical stabilizer VS of the aircraft. The inlet 331 is located at a leading edge LE of the vertical stabilizer VS. The location at the base B of the vertical stabilizer VS may provide good pressure recovery with a limited impact on the aircraft drag. Other locations for the inlet 331 may be contemplated in other embodiments, so long as sufficient pressure recovery is available in flight. As another possibility, for instance, the inlet 331 may be defined through the tail section wall T2. This will be described later with reference to FIG. 8.

As shown, the inlet 331 has a forward facing cross-section when taken along the aircraft longitudinal axis A'. In other words, the inlet 331 cross-section faces an outboard airflow resulting from a forward movement of the aircraft in the environment E. In some embodiments, such as shown, the inlet 331 cross-section is transverse to the aircraft axis A'. Such inlet 331 cross-section may be skewed with respect to the aircraft axis A' in other embodiments. For instance, the inlet 331 cross-section may face in a direction angularly offset with respect to the aircraft axis, e.g. in a radially outward direction when taken with respect to the aircraft fuselage. There may be an air redirecting device upstream of the inlet 331 cross-section to scoop part of the outboard air flow and redirect it through the inlet 331, in some embodiments. An example of such air redirecting device may be an actuated forward facing door (or panel) located at the inlet 331. This will be described later with reference to FIG. 8.

As mentioned above, the air conduit 330 includes a cooling plenum 333. The cooling plenum 333 may be a separate part assembled to or may be integral with the ram air inlet duct 330A, depending on the embodiments. The cooling plenum 333 includes a plenum fore section 333A and a plenum aft section 323B, with the fore and aft sections 333A, 333B respectively located upstream and downstream of the heat exchanger 310. The cooling plenum 333 has a plenum fore section 333A for collecting and redirecting the cooling air in the air conduit 330 to an inlet face of the heat exchanger(s) 310. The cooling plenum 333 has an aft section 333B receiving the cooling air having picked up heat from the at least one second conduit 312 of the heat exchanger 310. In the depicted embodiment, the cooling plenum 333 has a second outlet 332B different from the selectively closable outlet 332A, with the second outlet 332B fluidly connected to (connected to or merging with) the flow inducing device air conduit 323. In other words, the flow inducing device air conduit 323 ends at (or transition to) the plenum aft section 333B. As shown, the bell mouth 324 is within the plenum aft section 333B.

In the depicted embodiment, the plenum aft section 333B extends from the outlet face of the heat exchanger 310 to the outlet 332A. As shown, the outlet 332A of the air conduit 330 may be defined in a wall of the plenum aft section 333B. Such wall of the plenum aft section 333B may coincide with the tail cone compartment C wall C1. The wall of the plenum aft section 333B may be integral with the tail cone compartment C wall C1 in some embodiments.

The outlet 332A is a selectively closable outlet. The plenum aft section 333B has an aperture closing device 334 to selectively close or open the outlet 332A. The aperture closing device 334 may be actuated to restrict or block the selectively closable outlet 332A when in a closed position, and to allow and/or control the cooling air discharging through the outlet 332A toward the environment E when in an opened position. In the depicted embodiment, the aperture closing device 334 includes an actuated door 334A. The actuated door 334A may be defined in the wall of the plenum aft section 333B. The actuated door 334A may be mechanically and/or electronically controlled via a feedback system (discussed later). In a particular embodiment, the actuated door 334A is hingedly connected to the wall of the plenum aft section 333B. The actuated door 334A may be of a one-panel or multiple panels type. The aperture closing device 334 may be implemented or configured differently in other embodiments.

In some embodiments, the plenum fore section 333A defines a secondary selectively closable air inlet 335 in a wall thereof. The secondary selectively closable air inlet 335 (or simply "secondary inlet") may be fluidly connected to an inside area of the tail cone compartment C. Such secondary inlet 335 may allow air from the compartment C of the tail cone T to be sucked in the air conduit 330 simultaneously with the cooling air entering the air conduit 330 via the ram air inlet 331. The secondary inlet 335 may allow reducing the pressure drop in the air conduit 330, when, for instance, the pressure drop in the air conduit 330 that may be caused by the cooling air ingested at the ram air inlet 331 is excessive during normal aircraft ground operations and/or under icing conditions. In the depicted embodiment, the plenum fore section 333A has an aperture closing device 336 to selectively close or open the secondary inlet 335. The aperture closing device 334 may be actuated to restrict or block the secondary inlet 335 when in a closed position, and to allow and/or control an air flow sourced from the compartment C. In the depicted embodiment, the aperture closing device 336 includes an actuated door 336A. The actuated door 336A may be defined in the wall of the plenum fore section 333A. The actuated door 336A may be mechanically and/or electronically controlled via a feedback system (discussed later). In a particular embodiment, the actuated door 336A is hingedly connected to the wall of the plenum fore section 333A. The actuated door 336A may be of a one-panel or multiple panels type. The aperture closing device 336 may be implemented or configured differently in other embodiments where the secondary inlet 335 is present. As shown, an external wall (or skin) of the tail cone T may have louver panels LP, or other types of devices defining one or more openings allow outboard air to penetrate inside the compartment C of the tail cone T, to provide engine compartment ventilation, for instance. Air entering the air conduit 330 via the secondary selectively closable inlet 335 may thus be sourced from the compartment C supplied with air entering via the louver panels LP. As such, air fed into the plenum fore section 333A may be sourced from the ram air inlet 331 and/or the tail cone compartment C, depending on the embodiments.

A feedback system provides control over both door positions, depending on the mode of operation. The feedback system may be operatively connected to the aperture closing device(s) 334, 336 and operatable to actuate the aperture closing device(s) 334, 336. The feedback system may comprise computing device having a processing unit and a memory which has stored therein computer-executable instructions. The processing unit may comprise any suitable devices configured to implement the functionality of the feedback system such that instructions, when executed by the computing device or other programmable apparatus, may cause the functions/acts/steps performed by the feedback system to control the actuated door(s) discussed above. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory may comprise any suitable known or other machine-readable storage medium. The memory may comprise non-transitory computer readable storage medium, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions executable by the processing unit.

It should be noted that the computing device may be implemented as part of a FADEC or other similar device, including electronic engine control (EEC), engine control unit (EUC), engine electronic control system (EECS), and the like. In addition, it should be noted that the techniques described herein can be performed by an engine controller substantially in real-time, during operation of the engine assembly 100, for example during flight or other aircraft operating conditions.

Figure 8:
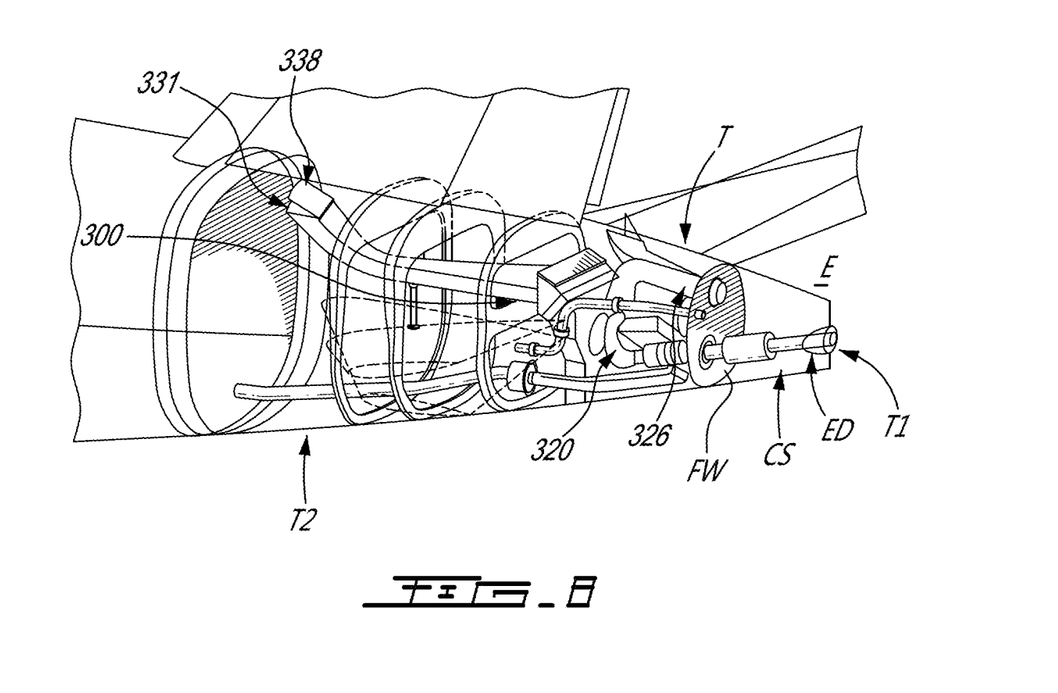
FIG. 8 is another schematic three dimensional partially transparent view of the aircraft power plant of FIGS. 3-5, according to an alternate embodiment, showing components of an inside compartment of the tail section of the aircraft.

Referring to FIG. 8, other embodiments of some features of the cooling system 300 described above are shown. It is to be understood that any features described above with respect to other embodiments may similarly apply to the cooling system 300 shown in FIG. 8. Only the features that are different to that discussed above with respect to other embodiments will be described hereunder.

As described above, the inlet 331 may be located at other locations than at the base B of the vertical stabilizer VS. In the depicted embodiment, the inlet 331 is defined through the tail section wall T2. The inlet 331 is defined at the surface of the external surface of the tail section wall T2, which may be referred to as the outer skin of the tailcone T. As shown, the inlet 331 is laterally offset with respect to the vertical stabilizer VS. The inlet 331 is shown rearward with respect to the leading edge LE of the vertical stabilizer VS. This may limit the inlet duct length extending between the inlet 331 and the heat exchanger, which may in turn reduce weight of the cooling system 300.

As described above, an example of air redirecting device upstream of the inlet 331 to scoop part of the outboard air flow and redirect it through the inlet 331 is shown. In the depicted embodiment, the air redirecting device includes an actuated forward facing door 338 located at the inlet 331. The actuated forward facing door 338 (or simply "door 338") may be hingedly connected to the inlet duct 330A and/or to the tail section wall T2, for instance. The door 338 may be actuated (e.g. pneumatically, hydraulically, electrically, mechanically) to restrict flow from entering (restrict or block) the inlet 331 or to open access to the inlet 331 for the outboard flow to penetrate the inlet duct 330A, when desired. Actuation of the door 338 may be controlled via the feedback system described above, for instance.

In the depicted embodiment the flow inducing device 320 outflow is discharged to the environment E outside the aircraft different from the embodiments described above. In the depicted embodiment, the tail cone compartment C has a wall FW, here a firewall defining separate tail cone compartment sections. The discharge duct 326 extends from the outlet (not shown on FIG. 8) and extends through the firewall FW. The discharge duct 326 outlet is defined within the rearwardmost tail cone compartment section CS. The flow inducing device 320 outflow is thus discharged within the tail cone compartment section CS (aft of the firewall FW). The outflow collected in such area may then be expelled in the outside environment E through an eductor ED, in which exit flow inducement is produced by the powerplant exhaust gas kinetic energy. As shown, the eductor ED is concentric with the exhaust pipe and fluidly interconnects the tail cone compartment section CS and the outside environment E at the apex T1 of the tail section T. The exhaust gas may be ejected through the exhaust pipe thereby inducing a flow in the eductor ED to suck out the outflow collected in the tail cone compartment section CS. In this configuration, the discharge duct 326 length may be limited, which may reduce weight compared to other embodiments described above.

The cooling system 300, described above with reference to various embodiments may allow two distinct operating modes, which may be incidental on the aircraft operations and/or heat rejection requirements for the power plant 200.

Figure 6:
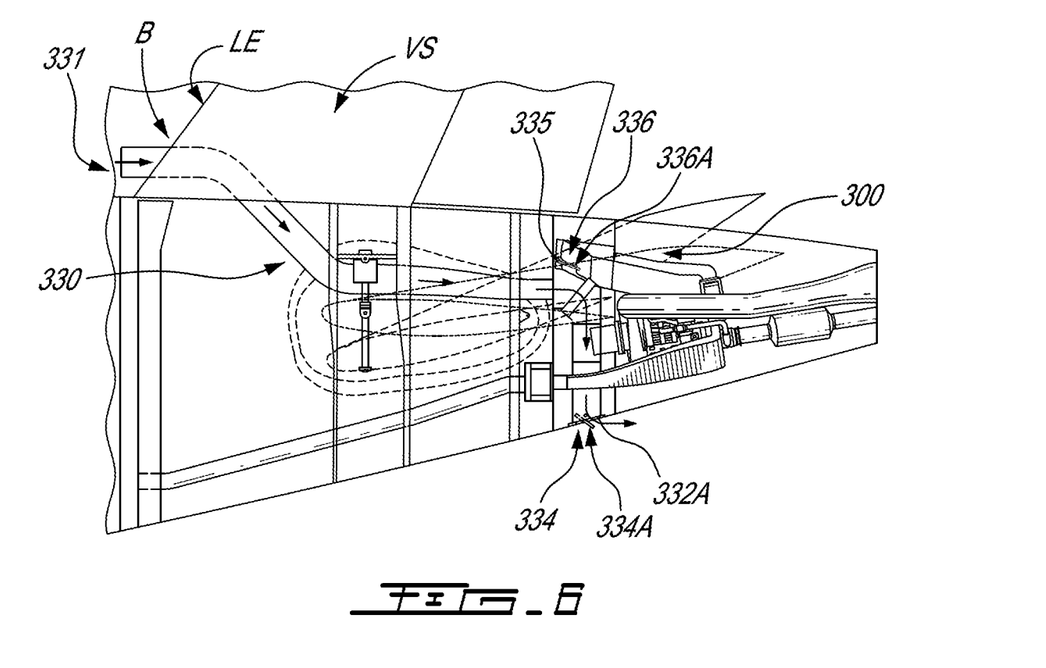
FIG. 6 is another schematic cross-sectional view of the aircraft power plant of FIGS. 3-5, illustrating a first operating mode of the power plant.

In a first operating mode, which may occur in flight, or above a given airspeed level, cooling air (all of or substantially all of) may be supplied to the cooling system 300 via the ram air inlet duct 330A. In this first operating mode, in embodiments where the aperture closing device 336 of the plenum fore section 333A is present, the aperture closing device 336 closes the secondary selectively closable inlet 335. The aperture closing device 334 at the selectively closable outlet 332A of the air conduit 330 is opened to allow bypassing the cooling air from the flow inducing device 320 and discharging the cooling air downstream of the heat exchanger 310. This is illustrated with the flow arrows in FIG. 6. In the first operating mode, the flow inducing device 320 may remain unoperated, as the cooling air may exit the air conduit 330 at least via the selectively closable outlet 332A, whereby, in some embodiments, all of the cooling air entering the air conduit 330 may exit the air conduit 330. Having the flow inducing device 320 unoperated in the first operating mode may allow for a reduction of fuel consumption for the power plant 200. In the depicted embodiment, the VIGVs 325 may be in a closed configuration to restrict or block the flow inducing device inlet 321 in the first operating mode to effect the air bypass to the selectively closable outlet 332A in the opened position. In embodiments where the VIGVs 325 is absent, the flow inducing device 320 may be unpowered, for instance via a clutch mechanism disengaging the flow inducing device 320.

Figure 7:
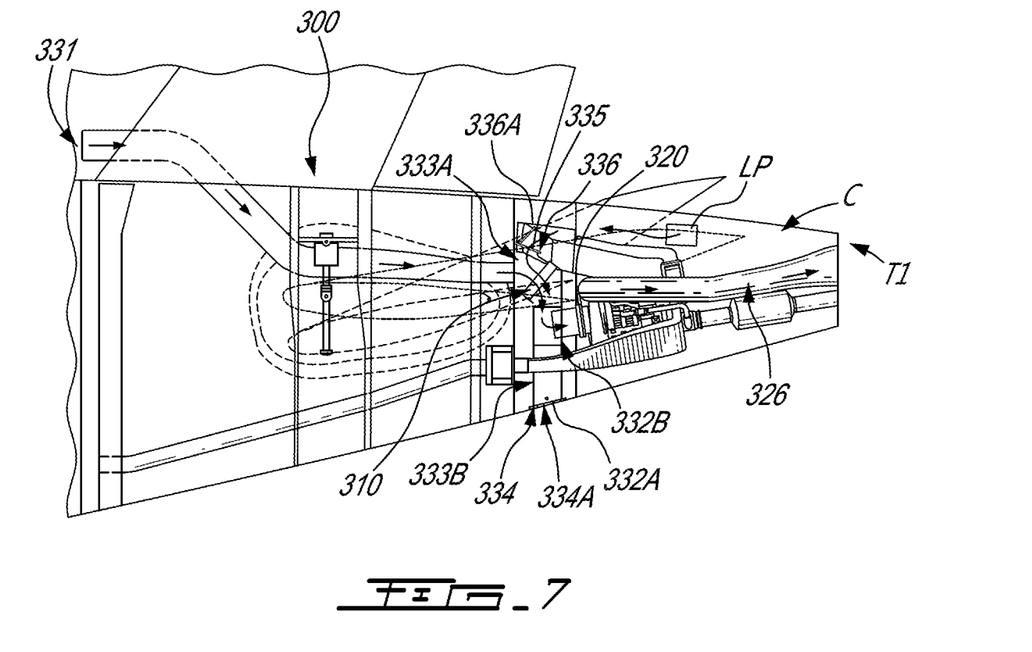
FIG. 7 is another schematic cross-sectional view of the aircraft power plant of FIGS. 3-5, illustrating a second operating mode of the power plant.

In a second operating mode, which may occur during ground operation or flight below a given airspeed, the flow inducing device 320 may induce the cooling air flow in the air conduit 330 when the pressure drop in the air conduit 330 is insufficient to allow enough cooling air flow via the ram air inlet 331 without added work from a powered flow inducing device. In this second operating mode, in embodiments where the aperture closing device 336 of the plenum fore section 333A is present, the aperture closing device 336 may leave the secondary selectively closable inlet 335 opened. As such, air may flow in the air conduit 330 via the ram air inlet 331 and the secondary selectively closable inlet 335. In this second operating mode, the aperture closing device 334 at the selectively closable outlet 332A of the air conduit 330 is closed to direct the cooling air through the flow inducing device 320 to be discharged at the flow inducing device outlet 332. In the embodiments where the VIGVs 325 is present, the VIGVs 325 may be in an opened configuration in the second operating mode to allow cooling air to flow via the flow inducing device 320. In some embodiments, all (all or substantially all) the cooling air entering the air conduit 330 via the ram air inlet 331 and/or the secondary selectively closable inlet 334 may exit the air conduit 330 via the flow inducing device discharge duct 326 downstream of the flow inducing device outlet 322, while the aperture closing device 334 is in the closed position. This is illustrated with the flow arrows in FIG. 7. In operation, the flow inducing device 320 de-pressurizes the air conduit 330, in particular the plenum aft section 333B, which may force a flow of cooling air entering the air conduit 330 upstream of the heat exchanger 310 to flow through the heat exchanger 310.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A cooling system for an aircraft power plant, comprising:
   a ram air inlet duct;
   a cooling plenum having an inlet fluidly connected to an outlet of the ram air inlet duct, a first outlet and a second outlet, the first outlet selectively closable;
   a heat exchanger including at least one first conduit having an inlet fluidly connected to the cooling plenum and at least one second conduit in heat exchange relationship with the at least one first conduit and fluidly connectable to a coolant circuitry of the aircraft power plant, the at least one first conduit having an outlet fluidly connected to the first outlet and the second outlet of the cooling plenum; and
   a flow inducing device operable for selectively inducing a flow of air from the inlet of the cooling plenum to the second outlet thereof when the first outlet of the cooling plenum is closed.

2. The cooling system as defined in claim 1, wherein the ram air inlet duct has a ram air inlet located at a base of a vertical stabilizer of an aircraft, at a leading edge thereof.

3. The cooling system as defined in claim 2, wherein the ram air inlet has a forward facing cross-section when taken along an aircraft longitudinal axis.

4. The cooling system as defined in claim 3, wherein the forward facing cross-section is transverse to the aircraft longitudinal axis.

5. The cooling system as defined in claim 1, wherein the flow inducing device includes a blower having a blower scroll and a blower rotor encased in the blower scroll.

6. The cooling system as defined in claim 1, further comprising variable inlet guide vanes fluidly connected to the second outlet, upstream of the flow inducing device to control a volume of air flow entering the flow inducing device.

7. The cooling system as defined in claim 1, wherein the cooling plenum has an aperture closing device to selectively close or open the first outlet.

8. The cooling system as defined in claim 7, wherein the aperture closing device includes an actuated door.

9. The cooling system as defined in claim 8, wherein the wall of the cooling plenum coincides with an external wall of a tail cone section of an aircraft.

10. The cooling system as defined in claim 1, wherein the cooling plenum defines a selectively closable air inlet in a wall thereof upstream of the heat exchanger.

11. The cooling system as defined in claim 10, wherein the cooling plenum has an aperture closing device to selectively close or open the selectively closable air inlet.

12. The cooling system as defined in claim 11, wherein the aperture closing device of the cooling plenum includes an actuated door.

13. The cooling system as defined in claim 10, wherein the selectively closable air inlet is fluidly connected to an inside area of a tail cone compartment, an external wall of the tail cone compartment including louver panels allowing outboard air to penetrate the inside area of the tail cone compartment.

14. The cooling system as defined in claim 1, further comprising a discharge duct downstream of the flow inducing device and fluidly connected therewith, the discharged duct in fluid communication with an environment outside the aircraft to route an air outflow of the flow inducing device in the environment.

15. A method of cooling an aircraft power plant having a combustion engine, the aircraft power plant provided on an aircraft, the method comprising:
   in a first operating mode, inducing a cooling air flow through a heat exchanger in an air conduit via a flow inducing device fluidly connected to the air conduit, the heat exchanger connected in heat exchange relationship with the power plant of the aircraft; and
   in a second operating mode, bypassing the cooling air flow from the flow inducing device via a selectively closable outlet of the air conduit downstream of the heat exchanger.

16. The method as defined in claim 15, wherein bypassing the cooling air from the flow inducing device in the second operating mode includes actuating an aperture closing device at the selectively closable outlet to open the selectively closable outlet.

17. The method as defined in claim 15, wherein the air conduit defines a plenum fore section and a plenum aft section downstream of the plenum fore section, the method further comprising, in the first operating mode, opening a secondary selectively closable inlet defined in the plenum aft section and fluidly connected to an inside area of a tail cone compartment, and providing a flow path from the inside area of a tail cone compartment to the air conduit.

18. The method as defined in claim 15, wherein bypassing the cooling air from the flow inducing device in the second operating mode includes preventing the cooling air flow from passing through the flow inducing device by closing variable guide vanes located upstream of an inlet of the flow inducing device.

19. The method as defined in claim 15, further comprising in the second a mode, inducing the cooling air flow through the heat exchanger via a ram air inlet duct of the air conduit, including ingesting cooling air at a ram air inlet located at a base of a vertical stabilizer of the aircraft, at a leading edge of said vertical stabilizer.

20. A method of cooling a power plant of an aircraft, the method comprising:
   in a first operating mode, driving a flow inducing device to induce a flow of cooling air through a heat exchanger connected in heat exchange relationship with the power plant of the aircraft; and
   in a second, in flight, operating mode, bypassing the flow inducing device and instead of using an airflow induced by the flow inducing device, using ram air to provide cooling air to the heat exchanger.

* * * * *